(12) United States Patent
Sullivan

(10) Patent No.: US 6,204,635 B1
(45) Date of Patent: Mar. 20, 2001

(54) CURRENT INTERRUPT APPARATUS PARTICULARLY ADAPTED FOR USE WITH PRISMATIC ELECTROCHEMICAL CELLS

(75) Inventor: Steven K. Sullivan, Cranston, RI (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/311,489

(22) Filed: May 13, 1999

Related U.S. Application Data
(60) Provisional application No. 60/086,400, filed on May 22, 1998.

(51) Int. Cl.$^7$ .................................................. H01M 10/46
(52) U.S. Cl. .............................. 320/134; 320/147; 429/53
(58) Field of Search ..................................... 320/134, 136, 320/147, FOR 142, FOR 145; 429/7, 53, 54, 55, 56, 61, 62, 64, 72, 82, 89, 167, 170, 172

(56) References Cited

U.S. PATENT DOCUMENTS

| | | |
|---|---|---|
| 5,691,073 | 11/1997 | Vu et al. . |
| 5,707,756 | 1/1998 | Inoue et al. . |
| 5,750,277 | 5/1998 | Vu et al. . |

FOREIGN PATENT DOCUMENTS

| | | |
|---|---|---|
| 19524870 | 2/1996 | (DE) . |
| 0674351 | 9/1995 | (EP) . |
| 0739047 | 10/1996 | (EP) . |
| 810677 | 3/1997 | (EP) . |
| 2743452 | 11/1997 | (FR) . |
| 08036999 | 2/1996 | (JP) . |
| WO 9738455 | 10/1997 | (WO) . |

*Primary Examiner*—Edward H. Tso
(74) *Attorney, Agent, or Firm*—Russell E. Baumann; Frederick J. Telecky

(57) ABSTRACT

A pressure actuated current interrupt device particularly useful for prismatic electrochemical cells has a cup-shaped member ($12, 12', 12'', 12''', 12^{IV}, 12^{V}, 12^{VI}$) mounted on the cover of the cell and arranged to protrude into the interior of the cell. The cup-shaped member can be formed either as a separate member or as a portion of a layer of a composite cover. The cup-shaped member has a side wall ($12b$) in which stress is created by pressure generated in the cell which acts on the generally flat end wall ($12a$) of the cup-shaped member. A selected amount of pressure causes the side wall to catastrophically collapse with the configuration of the cup-shaped member being inverted to permanently break the electric current path with a cover mounted terminal. A composite cover ($8^{iv}$, $8'$) includes a membrane layer in which the cup-shaped member is formed and which can also include a pressure vent ($12g$).

20 Claims, 11 Drawing Sheets

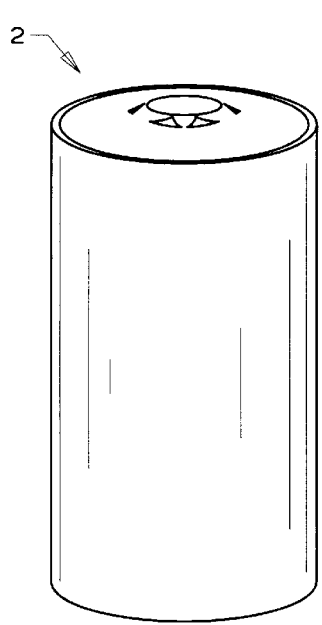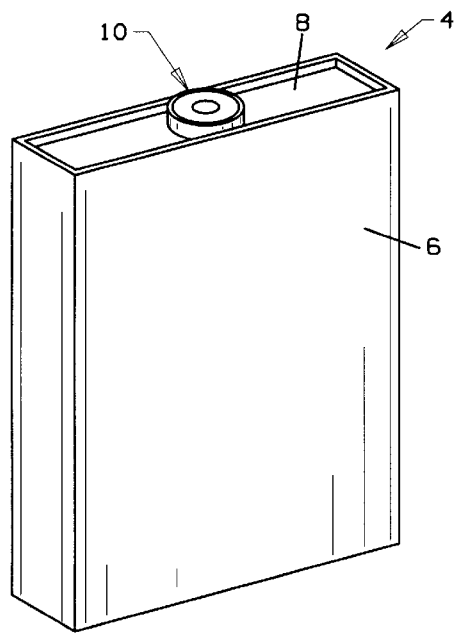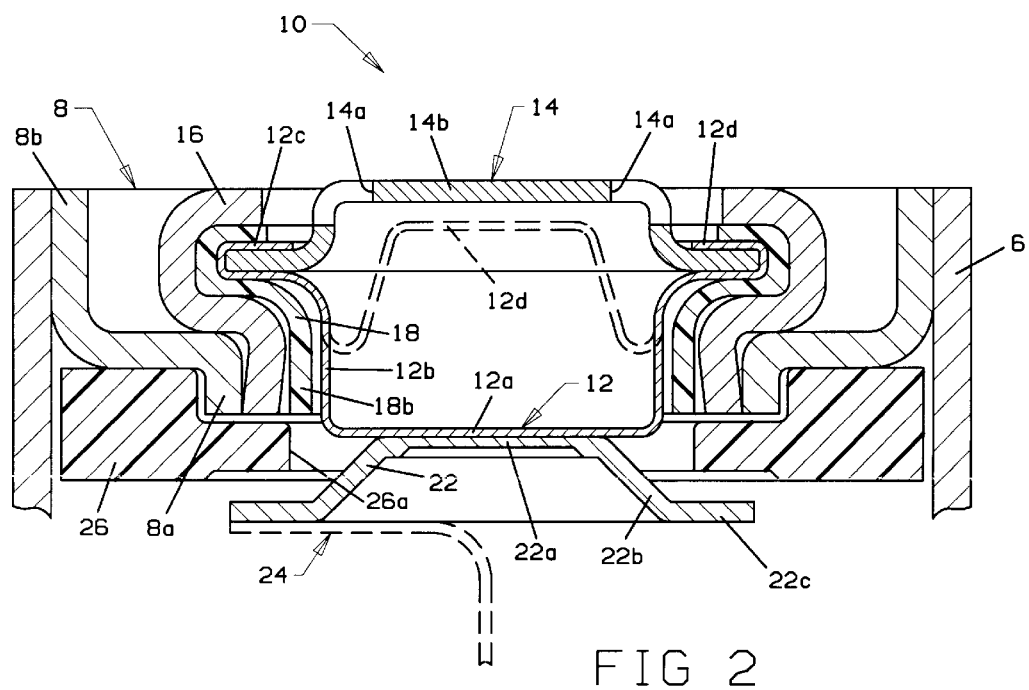

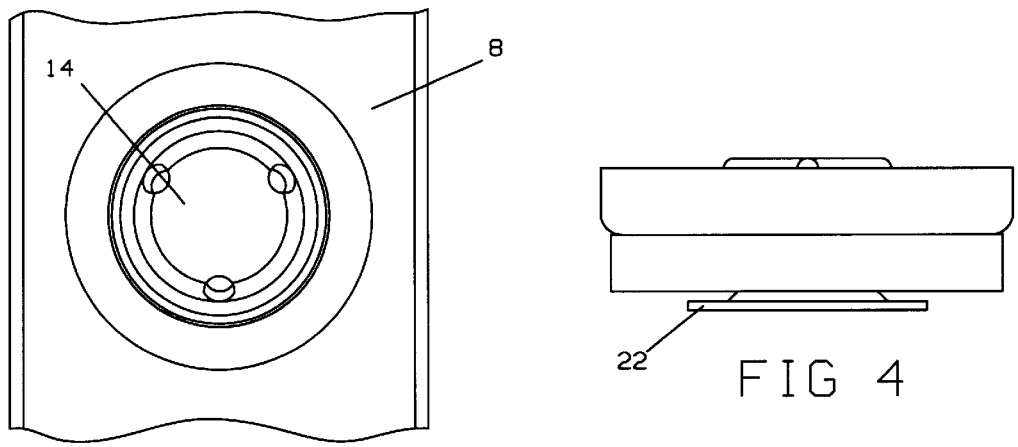
FIG 3
FIG 4
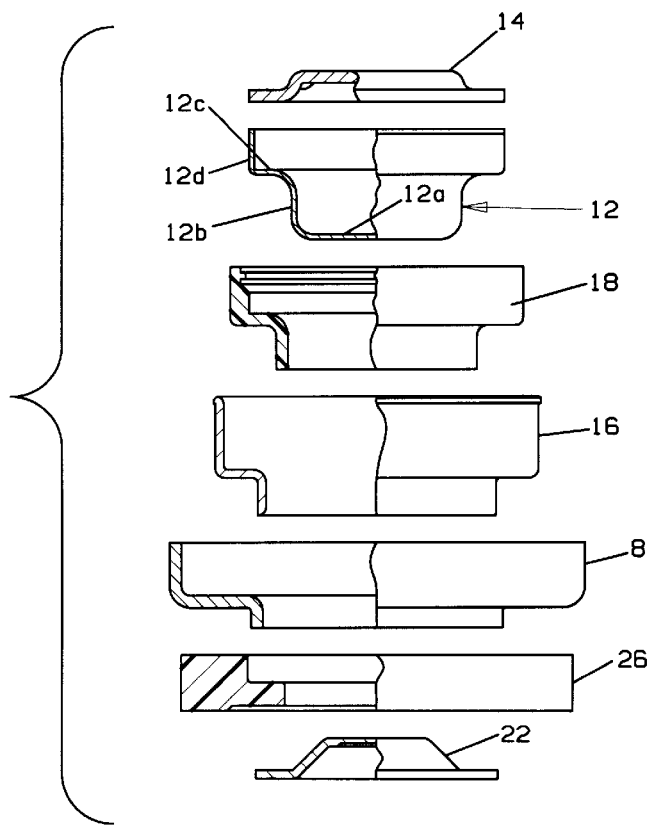
FIG 5

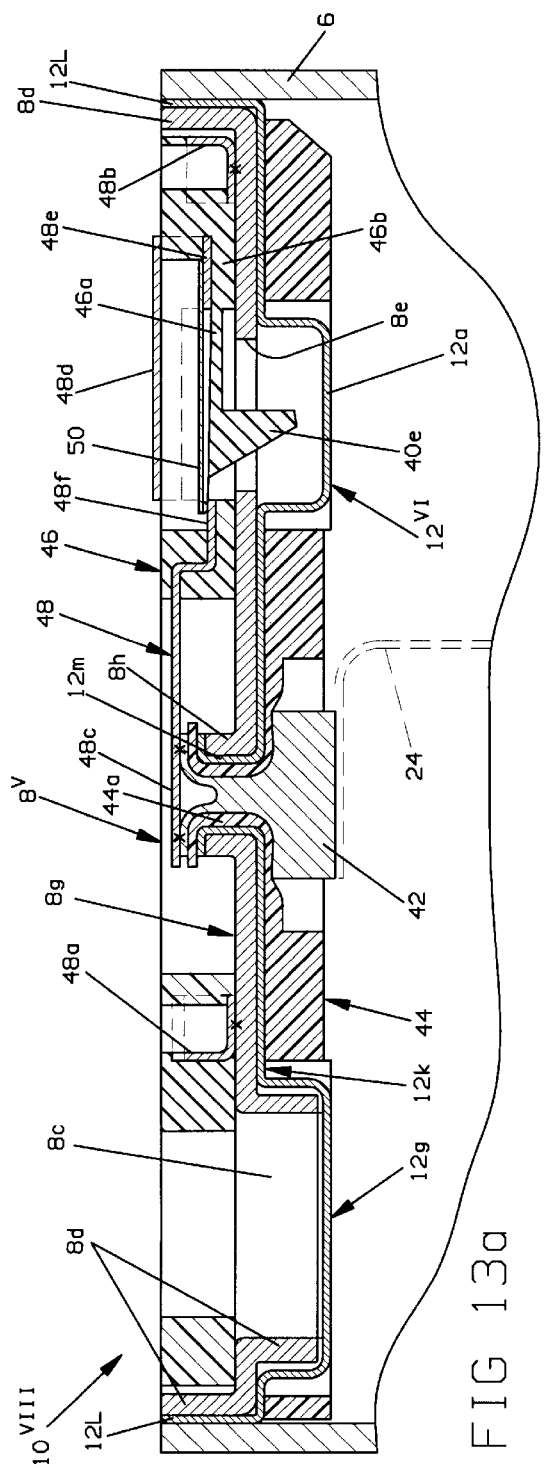
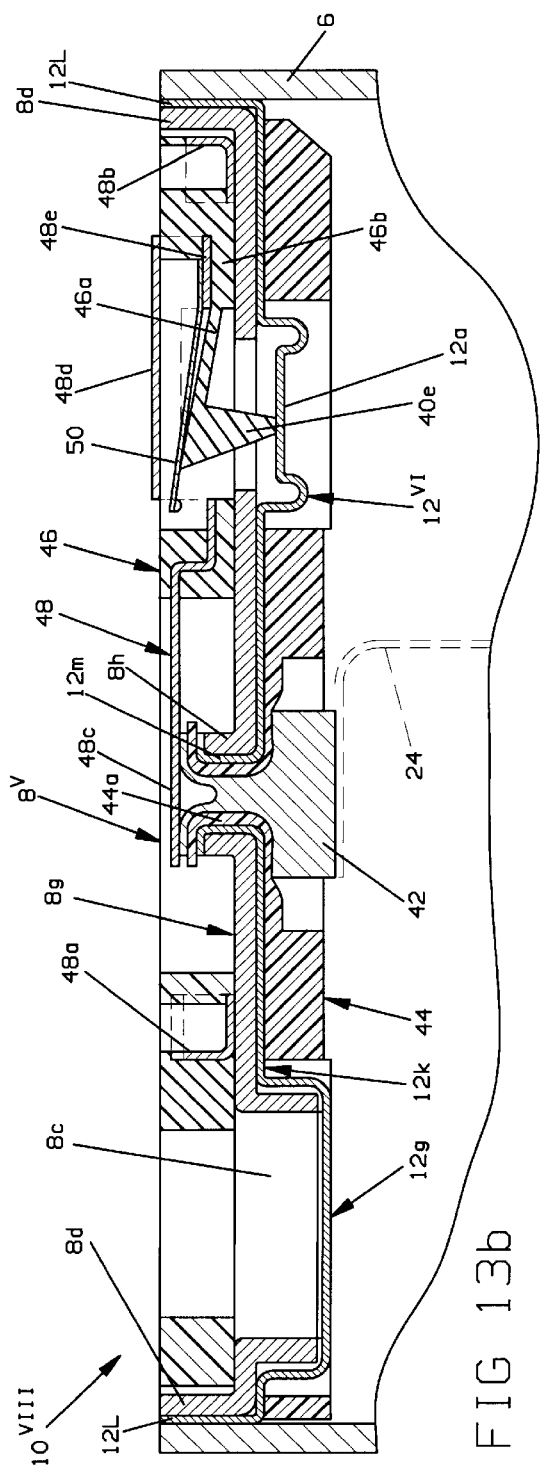
FIG 13a
FIG 13b

CURRENT INTERRUPT APPARATUS PARTICULARLY ADAPTED FOR USE WITH PRISMATIC ELECTROCHEMICAL CELLS

RELATED APPLICATION

Benefit is claimed of Provisional Application Ser. No. 60/086,400, filed May 22, 1998.

FIELD OF THE INVENTION

This invention relates generally to electrochemical cells and more particularly to current interrupt apparatus for use with prismatic electrochemical cells responsive to selected adverse conditions.

BACKGROUND OF THE INVENTION

Electrochemical cells, especially high energy density cells such as those in which lithium is an active material, are subject to leakage or rupture as a result of various abusive treatment, which in turn, can cause damage to a device which is powered by the cell or to the surrounding environment. Such cells are sealed to prevent egress of electrolyte solvent and ingress of moisture from the exterior environment. When a cell is overcharged, self-heating occurs during the charging procedure. Examples of abusive treatment include charging at too rapid a rate, overcharging above a specified maximum voltage or discharging below a specified minimum cell voltage which can lead to an increase in temperature and/or pressure. In the case of cells utilizing lithium, should the temperature exceed a certain point an exothermic reaction begins which leads to overheating and causes a build-up in pressure which may result in expulsion of electrolyte from the cell.

It is known for commercially available cylindrical lithium ion electrochemical cells to incorporate a pressure driven current interrupt device to terminate current flow under adverse charge or discharge conditions. Typically, a thin metallic diaphragm, e.g., formed of aluminum, mounted in a header of the cell and exposed to pressure generated in the cell is attached to a pressure plate at the central axis, as by laser or ultrasonic welding, with an electrical insulator sandwiched therebetween. As pressure increases stress is created at the welded interface with the weld joint fracturing at a selected pressure range allowing the diaphragm to translate away from the plate to permanently open the electric circuit and terminate current flow. In some designs, the diaphragm is formed with a reduced thickness portion, e.g., a C-shaped groove extending along the peripheral edge of the diaphragm so that the diaphragm ruptures at a calibrated predetermined pressure to allow controlled venting of pressurized electrolyte. A current interrupt device of this type is shown in U.S. Pat. No. 5,691,073.

The above described end cap and current interrupt device assembly can be used conveniently in cylindrical electrochemical cells typically having diameters of 17 mm or more. However, as cell size is reduced the available membrane surface used to drive the pressure current interrupt device is reduced so that with prismatic cells having a thickness of only 10 mm, 8 mm or 6 mm, for example, the diameter of the working portion of the diaphragm is too small to provide sufficient translation to fracture the welded joint with the pressure plate so that a different operational mechanism is needed to provide the current interrupt function. As a result of the size limitations of such prismatic cells, the prevalent header related safety feature currently in commercial use is a pressure vent which allows controlled release of pressurized electrolyte in order to prevent cell explosion.

SUMMARY OF THE INVENTION

It is an object of the present invention to provide a current interrupt device particularly suited for prismatic electrochemical cells having a relatively narrow thickness free of the above noted limitations. Another object of the invention is the provision of a current interrupt device which is adaptable to a wide range of cell sizes, but particularly to cells having a small thickness, as small as 6 mm or even less. Yet another object is the provision of a current interrupt device which may also include other safety features such as short circuit and over current protection as well as a pressure vent mechanism.

Briefly stated, in accordance with one preferred embodiment of the invention, an annular header, adapted to be attached in fluid sealing relation to a cover of an electrochemical cell, mounts a generally cup-shaped member having a generally flat, relatively stiff end wall and a cylindrical side wall extending in a direction from the end wall toward the exterior of the cell with a free end of the side wall attached to the header and with the flat stiff end wall exposed to the pressurized fluid in the cell. The cup-shaped member is formed of electrically conductive material and in this embodiment and several others forms part of the current path between one of the plates of the core of the cell through a strap welded to the cup-shaped member and a top cap mounted on the header. In a lithium ion cell where the top cap serves as the positive terminal of the cell, the cup-shaped member may advantageously be formed of aluminum with side walls formed to catastrophically collapse/buckle with a sudden or snap action movement at a specific pressure level due to axial and moment stress created by internal cell pressure. According to an optional feature of the invention, a reduced thickness groove, preferably generally circular in shape, and a transition section connecting the side wall and the groove is used to aid in achieving low pressure actuation protection and/or to provide calibration of the pressure level at which the side wall collapse occurs by controlling the effective length of the moment arm of the applied stress to the side wall to offset material geometry and variations in material properties. In a modified embodiment, calibration for variations in material geometry and properties can be provided by changing the internal radius between the side and end walls to effectively change the moment arm. The instantaneous, catastrophic collapsing motion is used in one preferred embodiment to fracture a welded joint between the end wall and a pressure plate to interrupt the current path. The collapsing motion is used to move an electrical insulator to permanently open a spring loaded electrical contact interface in one embodiment and to fracture welded electrical contact interface disposed externally of the casing of the cell in another embodiment. According to a feature of a modified embodiment, single action short circuit protection can be provided in certain embodiments by using spring material having thermal memory, such as Nitinol, or thermostat metal which revert back to a calibrated, open contact configuration upon sufficient $I^2r$ heating. Yet another modified embodiment employs a positive temperature coefficient of resistivity element for short circuit protection.

Several embodiments utilize a current interrupt device which is crimped to a cover assembly which in turn is welded to the side wall of the electrochemical cell. Another embodiment includes a composite cover comprising a membrane or sheet layer which is essentially co-extensive with a support layer in which both a pressure vent and a current interrupt device is incorporated with the composite cover and membrane crimped to the side wall of the cell. Still other embodiments show a composite cover provided with both a pressure vent and current interrupt device in which the composite is welded to the side wall of the cell. In the latter embodiments a separate terminal is mounted through an aperture formed in and electrically isolated from the composite.

BRIEF DESCRIPTION OF THE DRAWINGS

The present invention will be more fully understood and appreciated from the following description taken in conjunction with the drawings in which:

FIG. 1a is a perspective view of a typical cylindrical electrochemical cell and FIG. 1b is a perspective view of a prismatic cell incorporating a current interrupt device made in accordance with several embodiments of the invention;

FIG. 2 is a cross sectional view of the top portion of the FIG. 1b cell including a header mounting the current interrupt device made in accordance with a first embodiment of the invention;

FIG. 3 is a top plan view, partly broken away, of the header and current interrupt device of FIG. 2;

FIG. 4 is an elevational side view of the FIG. 3 structure;

FIG. 5 is an exploded view, partly in cross section, of the FIG. 3 structure;

FIG. 13 is a simplified top plan view of a prismatic electrochemical cell having a composite cover welded to the cell casing made in accordance with embodiments shown in FIGS. 13a, 13b, 14 and 14a;

FIG. 13a is a cross sectional view taken on line 13a—13a of FIG. 13;

FIG. 13b is a view similar to FIG. 13a but shown in the actuated, open-circuit condition of the current interrupt device;

DETAILED DESCRIPTION OF PREFERRED EMBODIMENT

Figure 5A:
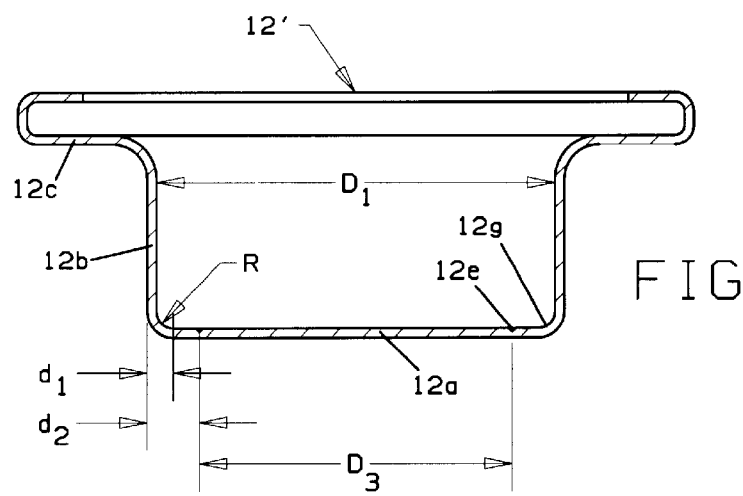
FIG. 5a is a cross sectional view of the cup-shaped member of FIGS. 2–5 shown with calibration structure.

With reference to FIG. 1a, a typical cylindrical electrochemical cell 2 is shown. Since the end faces of cell 2 are circular, essentially the entire area can be used to accommodate an appropriate safety mechanism such as those shown in copending U.S. Provisional Application Ser. No. 60/071, 557, filed Jan, 15, 1998 or U.S. Pat. No. 5,691,073, referenced supra. Such safety mechanisms are characterized in having a flexible diaphragm exposed to the fluid within the cell which bulges upon a selected increase in pressure creating sufficient stress to fracture a welded joint of the diaphragm and a pressure plate and to provide sufficient translation to break a current path, either directly or through a motion transfer member. With respect to a prismatic electrochemical cell such as cell 4 shown in FIG. 1b, the working diameter available for a diaphragm is limited by the thickness of the cell so that insufficient translational movement is obtainable in small prismatic cells to effectively use the teachings of the above noted safety mechanisms. As a result, typically, protection located in the header for small prismatic cells has been limited to forming a pressure vent (not shown) in cover 8 without interrupting the current path between the terminals comprising a thin membrane received over an aperture in the cover and rupturable at some specified pressure level.

FIGS. 2–5 show a current interrupt device 10 made in accordance with a first embodiment of the invention, especially adapted for use in small prismatic cells, although useable in other applications as well. Current interrupt device 10 comprises a cup-shaped member 12 having a generally flat bottom wall 12a and side wall 12b extending upwardly, i.e., in a direction away from the interior of the cell, as seen in the drawings, to a radially extending flange 12c. Stated in another way, the side wall of the cup-shaped member extends from its mounting location, in a direction toward the interior of the cell. Cup member 12 is formed with side wall 12b and end wall 12a forming an interior angle preferably greater than 90° to facilitate having the force generated by pressure generated in the cell to act on the side wall through a controlled moment arm utilizing end wall 12a to be discussed. Flange 12c is crimped onto a top cap terminal plate 14 by a crimp ring 16 with an electrically insulative sleeve 18 interposed therebetween to electrically isolate terminal plate 14 and cup-shaped member 12 from crimp ring 16 and cover 8 and to provide an electrolyte seal. As shown (see FIG. 5), flange 12c is advantageously formed with an extended, upwardly formed free end portion 12d to be folded over onto the top surface of the outer flange 14a of terminal plate 14 to provide an extended seal path without sharp edges. That is, the possibility of a sharp blanking burr on terminal plate 14 cutting through the polymer seal 18 is obviated. Crimp ring 16 is received in an opening of cover 8 of prismatic cell 4 formed by downwardly extending wall portion 8a and hermetically attached thereto as by laser welding around the perimeter of wall portion 8a. Cover 8 is in turn hermetically attached to side wall 6 of the cell as by laser welding an upper wall portion 8b thereto. An electrically conductive plate 22 is attached to the center portion of bottom wall 12a, as by laser or ultrasonic welding, which in turn is welded to an electrode tab 24 from the core of the cell. An electrical insulator member 26 having an aperture 26a is disposed intermediate to cover 8, crimp ring 16 and plate 22 to maintain electrical isolation between cover 8, crimp ring 16 and plate 22 and to limit translation of plate 22 in the case of actuation of the current interrupt device to be discussed below. If desired, insulator member 26 could be eliminated by extending vertical wall portion 18b of sleeve 18 toward plate 22 and between the outer portion of plate 22 and the cup member surface.

As mentioned above, top cap terminal plate 14, along with crimp ring 16, supports an electrolyte seal in the form of sleeve 18 of suitable material such as polypropylene. Plate 14 serves as a positive or negative electrode of the cell and forms part of the current path. Terminal plate 14 is formed with an offset central portion 14b which provides a cavity for collapse and inversion of cup member 12 while vent holes formed through plate 14 allow air volume displacement during such collapse.

Plate 22 is preferably formed with a reduced thickness center portion 22a of approximately the same thickness as that of end wall 12a as in aid in providing a good laser or ultrasonic weld joint with wall 12a of cup member 12. A frusto-conical section 22b provides a selected gap between outer peripheral flange 22c allowing for creep displacement of the cup member prior to the collapse of the side wall 12b. This ensures calibrated actuation of the current interrupt device and impact loading of the electrical interface to open the circuit. Holes (not shown) are formed in plate 22 to allow pressurization of the cup member.

As alluded to above and for the following several embodiments, the current interrupt device can be used with a positive or negative core polarity as desired. In the case of positive core polarity for a lithium ion cell, such suitable materials include: terminal plate 14—nickel plated cold rolled steel AISI 1008 1008; cup member 12—3003 aluminum; sleeve 18—polypropylene; crimp ring 16—nickel plated cold rolled steel AISI 1008; Cover 8—nickel plated cold rolled steel AISI 1008; insulative member 26—Nylon; and plate 22—3003 aluminum. In the case of negative polarity for a lithium ion cell, suitable materials include: terminal plate 14—nickel plated cold rolled steel AISI 1008; cup member 12—copper CDA C10500; sleeve 18—polypropylene; crimp ring 16—aluminum 3003; cover 8—aluminum 3003; insulative member 26—Nylon; and plate 22—copper CDA C10500.

Cup-shaped member 12 is formed from material having a selected diameter, ultimate strength and wall thickness so that when internal pressure generated within cell 4 increases, side wall 12b is unable to support the load placed on it once the force exerted on the side wall exceeds the material's ultimate strength at which point the side wall catastrophically collapses with end wall 12a, generally maintaining its flat configuration, translating toward terminal plate 14 with the end wall staying in a plane generally parallel to the plane in which the cover lies and the cup-shaped member going into an inverted structure as shown in dashed lines 12d. Side wall 12b of suitable material such as drawn aluminum or copper collapses at a specific pressure level due to axial and moment stress created by internal cell pressure. The translation of wall 12a creates stress at the welded interface with plate 22 constrained by insulator member 26 causing the weld joint to fracture at a specified pressure range allowing the side and end walls to translate away from plate 22 thereby permanently opening the electrical circuit and terminating any current flow. The particular length of side wall 12b is selected based on the amount of vertical translation desired. As shown in FIG. 5(a), end wall 12a and side wall 12b are joined together by a curved surface of radius R. Preferably, a circular groove 12e of selected diameter of reduced thickness is formed in the bottom wall by etching, coining or the like, i.e., the groove is formed a selected distance from side wall 12b with a transition section 12g extending between the radius R in side wall 12b and the location of groove 12e.

Figure 15:
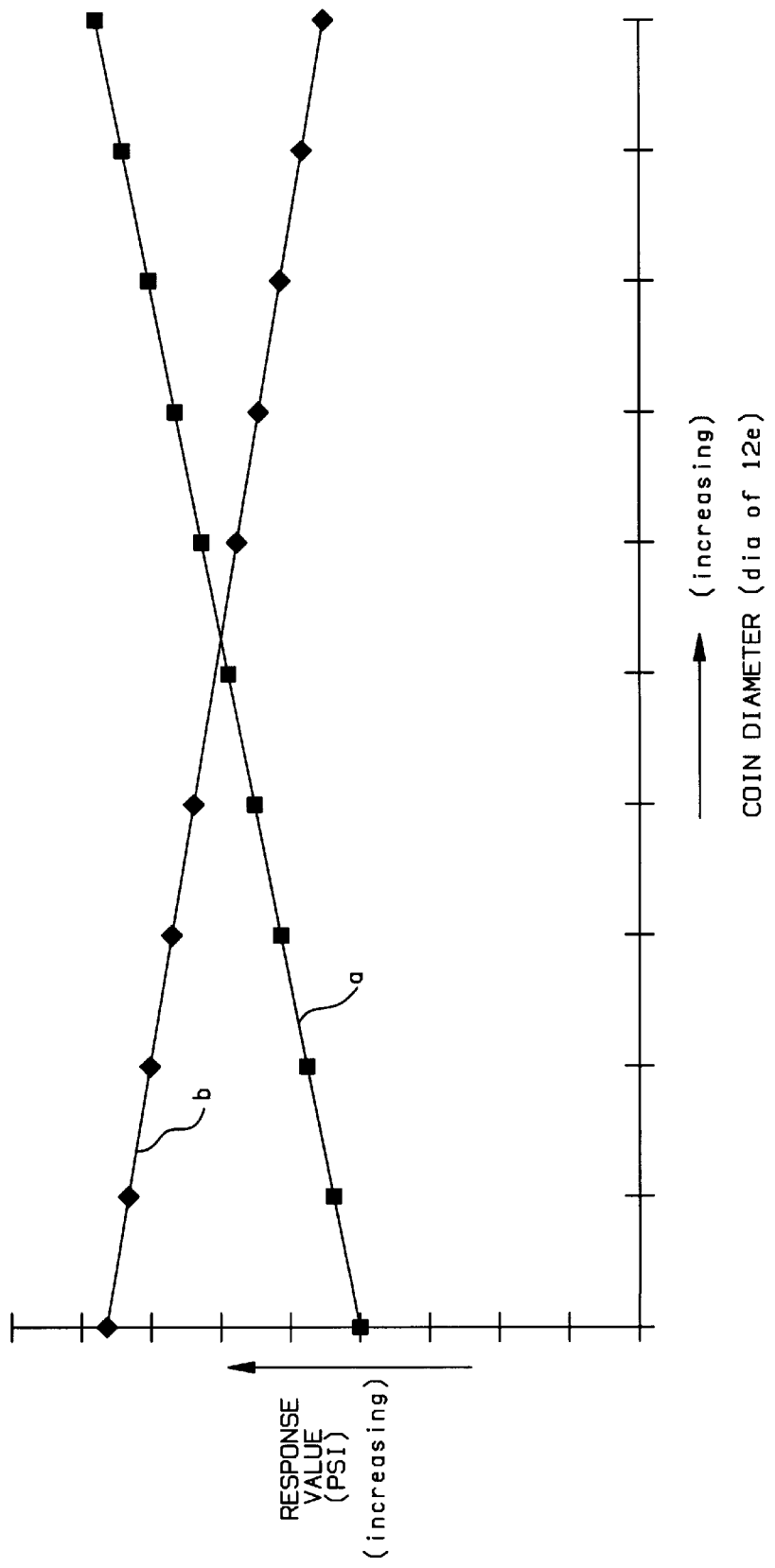
FIG. 15 shows a graph relating to calibration of interrupt devices of the present invention.

It is to be understood that the action that results in weld separation between cup-shaped member 12 and plate 22 may be a combination of side wall and transition section collapse/buckle. The diameter of groove 12e and the radius R interact with each other to provide means for calibrated actuation of the side wall collapse. With reference to FIG. 15, two groups of cup-shaped members formed of aluminum having a material thickness of 0.004 inch and a side wall 12a diameter of 0.150 inch were submitted to increasing pressure to simulate the internal pressure of an electrochemical cell. One group had a radius R of 0.03 inch (line a) while the second group had a radius R of 0.015 inch (line b). It can be seen from the graph that for a given diameter of groove 12e radius R and the diameter of groove 12e can be varied accordingly to provide various actuation values. Thus, variations in wall thickness and in material ultimate strength can be compensated for by using calibration features as shown in FIG. 5a to adjust the effective length of the moment arm of the applied bending stress. As suggested above, the value of the radius R between end wall 12a and side wall 12b to provide a greater or smaller moment arm length $d_1$. The circular groove of reduced thickness 12e which can be formed of various selected distances to provide different moment arms $d_2$ from the side wall 12b.

Figure 5B:
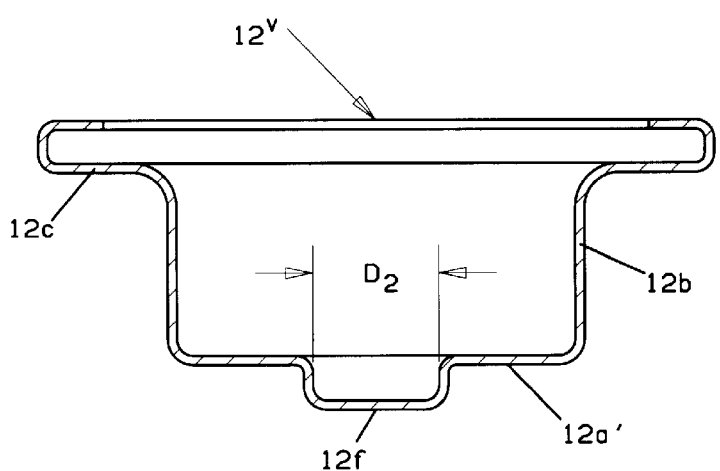
FIG. 5b is a view similar to FIG. 5a showing a modified cup-shaped member.

As seen in FIG. 5b, end wall 12a' of cup-shaped member 12$^v$ can also be formed with a vertically offset circular central portion 12f, preferably offset downwardly as viewed in the figure. For the purposes of discussion, the term "generally flat end wall" is used to describe this modification as well as end wall 12a since the configuration of both end walls 12a and 12a' remains generally unchanged before and after collapse of the side wall of the cup-shaped member upon overpressure. The diameter of the offset portion of end wall 12a' relative to the diameter of the side wall will impact the effective length of the moment arm. Further, the specific angle formed between the plane of the end wall 12a and side wall 12b can be used as a calibration factor.

With reference to FIGS. 5a, 5b, the actuation pressure (P) of the collapse is influenced by several physical factors. For a defined material selection (e.g., aluminum, copper, steel, nickel) the pressure which promotes collapse of the side wall is decreased as the outside diameter ($D_1$) of the cup-shaped member is increased, material thickness (t) is decreased, ultimate tensile strength (UTS) is decreased, offset diameter ($D_2$) is increased, and the manipulation of an interaction between the coin diameter ($D_3$) and radius (R) is selected for optimum performance.

Mathematically, a linear relationship can be defined as:

$$P = C_1 - C_2(D_1) + C_3(t) + C_4(UTS) - C_5(D_2) + C_6(D_3)(R)$$

With $C_1$–$C_6$ being constants depending upon unit selection and geometry. The interaction between diameter $D_3$ and radius R can be used as a calibration feature to adjust for normal in specification variation of material thickness, material structural properties, and form tool wear thereby centering the actuation pressure to application specifications.

Figure 6:
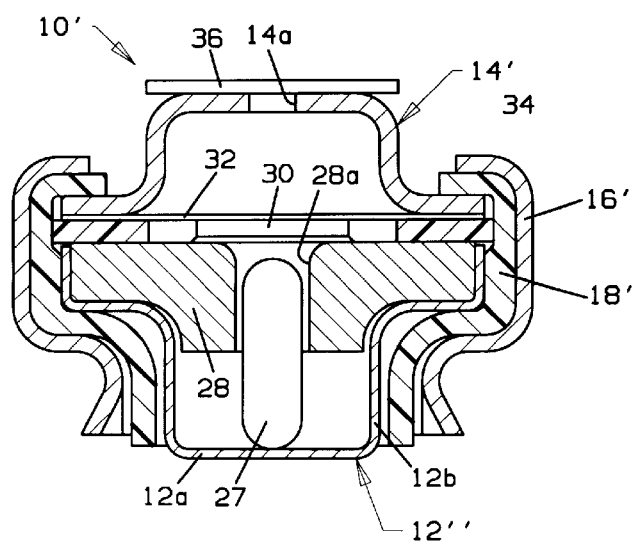
FIGS. 6, 7 and 8 are cross sectional views of modified embodiments of the current interrupt device.

FIG. 6 shows a modified embodiment in which an actuator pin 27 is slidably mounted in a bore 28a of an electrically conductive support plate 28 and is adapted to transfer motion from bottom wall 12a to an electrical contact portion 30 of an electrically conductive spring member 32 to move contact portion 30 out of electrical engagement with support plate 28 when side wall 12b of cup member 12" collapses due to a pressure increase above a predetermined level, as explained above, to provide a non-resettable current interrupt device. A suitable electrically insulative gasket 34 separates terminal plate 14' and spring member 32 from support plate 28. If desired, spring member 32 can be formed of material having thermal memory, such as Nitinol, to provide a current interrupt device which responds to short circuit conditions. Sufficient I²r heating generated within the spring causes changes in the material structure and causes a predetermined change in shape of the spring member, in this case to a configuration in which the central part of the spring is displaced away from the support plate 28 which serves as the stationary contact. Alternatively, spring member 32 can be formed of beryllium copper or other suitable material to provide a pressure actuated current interrupt function only. It will be understood that in either alternative the contact interface surfaces may be plated with gold, silver or the like to reduce interface resistance. Pressure sensitive adhesive tape 36 may be disposed on top of terminal plate 14' covering hole 14a for use when washing the cell after its assembly and prior to use.

Figure 7:
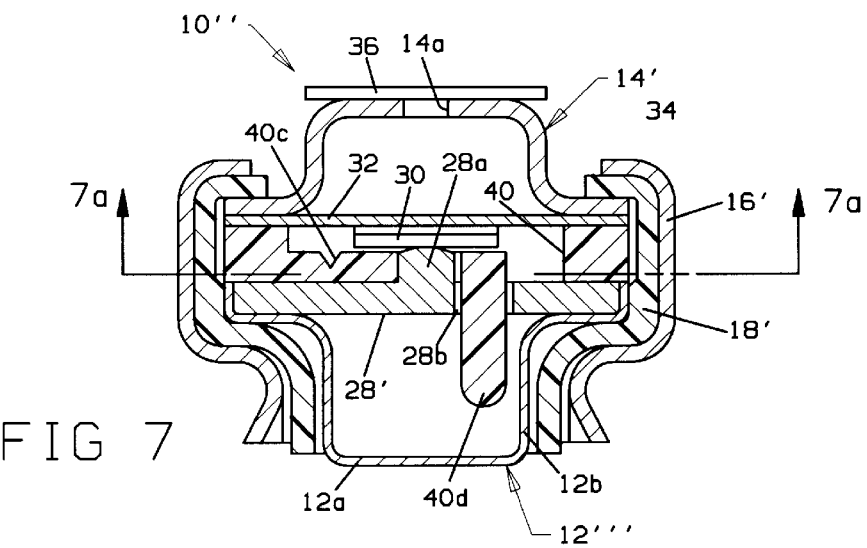
Figure 7A:
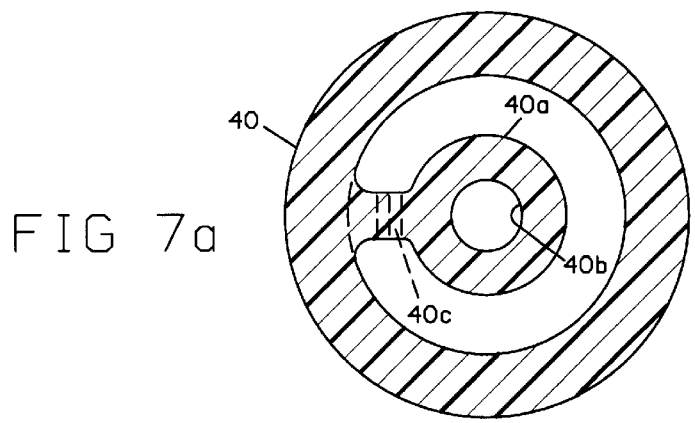
FIG. 7a is a sectional view of the FIG. 7 combination insulator/actuator taken on line 7a—7a of FIG. 7

FIGS. 7 and 7a show another alternate embodiment 10" similar to the FIG. 6 embodiment except that the functions of the actuator pin and the gasket are combined into a singled molded insulative actuator member 40 which has a cantilever arm 40a formed with a bore 40b which receives stationary contact 28a of support plate 28' therethrough. Arm 40a is formed with a hinge portion 40c comprising a reduced thickness groove to allow arm 40a to pivot in response to an upward force placed on actuator portion 40d which depends from the distal free end of arm 40a through an aperture 28b in support plate 28' into the chamber formed by side wall 12b and end wall 12a. As in the above embodiments, side wall 12b collapses at a preselected pressure with wall 12a moving upwardly forcing actuator portion 40d to move upwardly separating movable contact 30 from stationary contact 28a. As in the FIG. 6 embodiment, spring member 32 can be formed of thermal memory material such as Nitinol to provide current interruption in response to short circuit conditions or conventional spring material to provide current interruption only in response to pressure.

Figure 8:
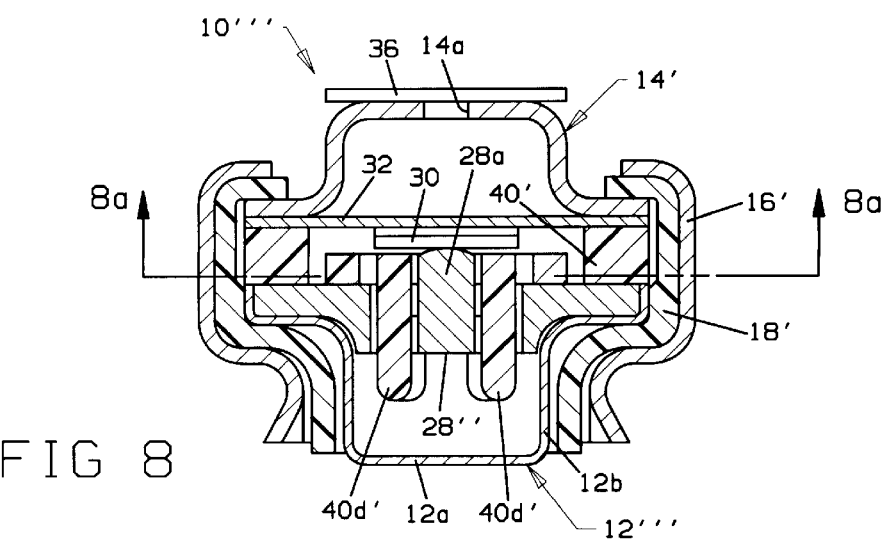
Figure 8A:
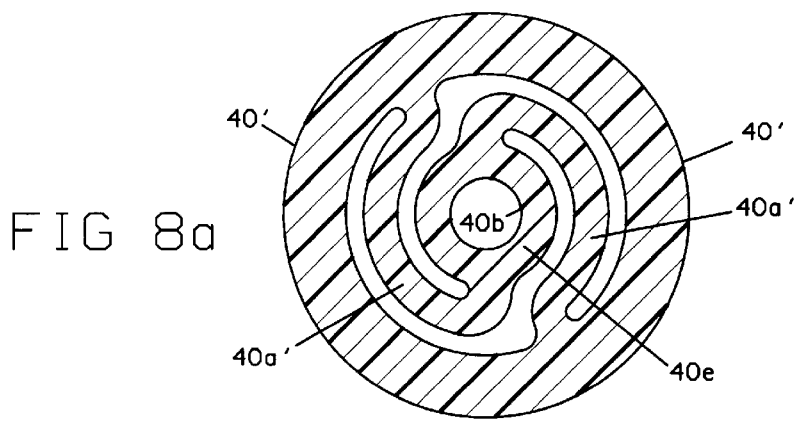
FIG. 8a is a sectional view of the combination insulator/actuator taken on line 8a—8a of FIG. 8.

FIGS. 8 and 8a show another alternate embodiment similar to FIGS. 6 and 7. In FIG. 8, actuator member 40' is formed with transversely extending spiral arms 40a' to provide extended flexible vertical translation. A pair of actuator members 40d' depend downwardly from central ring portion 40e and serve the same purpose as actuator member 40d of FIG. 7.

The above described embodiments relate to current interrupt devices or safety headers which are welded to the cover of a cell. The following embodiments relate to cell covers which integrate a current interrupt device and a pressure vent with the integrated covers either crimped or welded to the cell casing.

Figure 9:
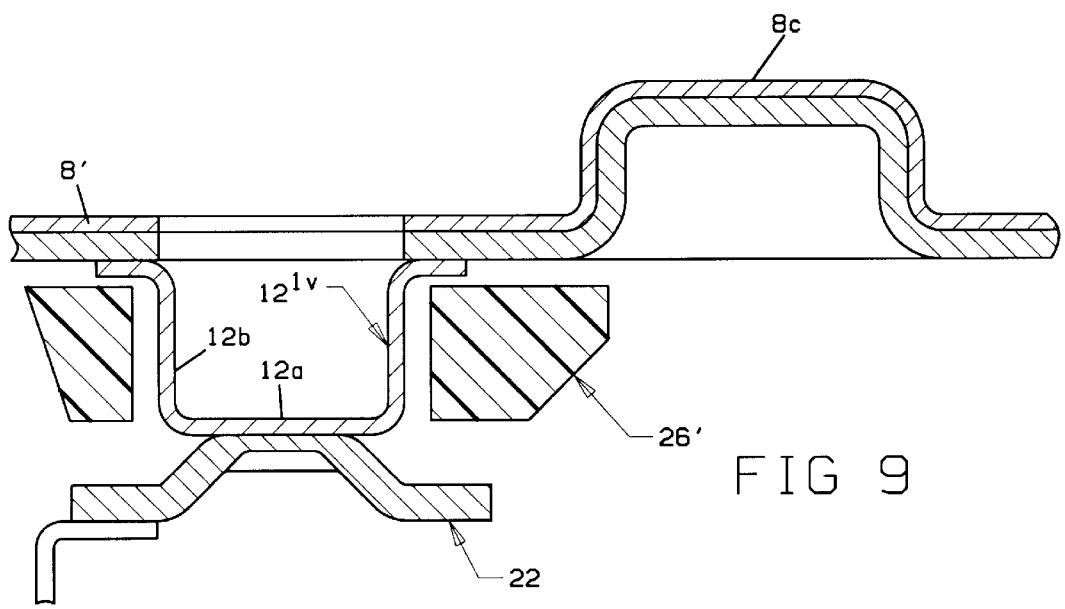
FIGS. 9–11 are partial cross sectional views of modified embodiments relating to cells in which the header assembly incorporating the current interrupt device is crimped into the cell casing by compression of a gasket.
Figure 10:
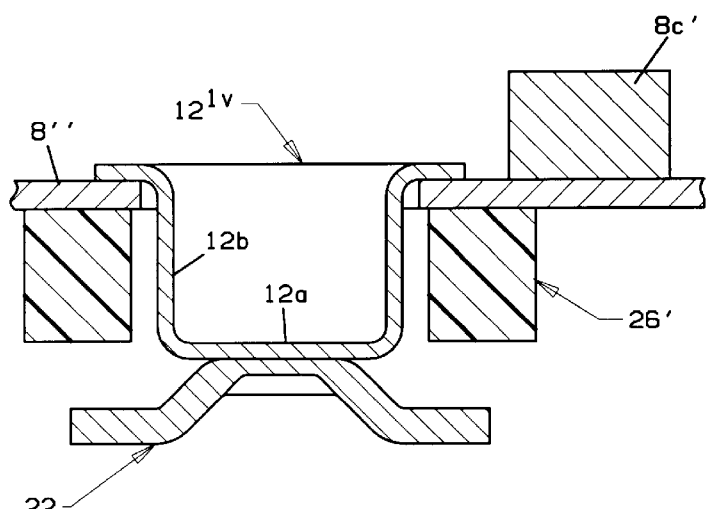
Figure 11:
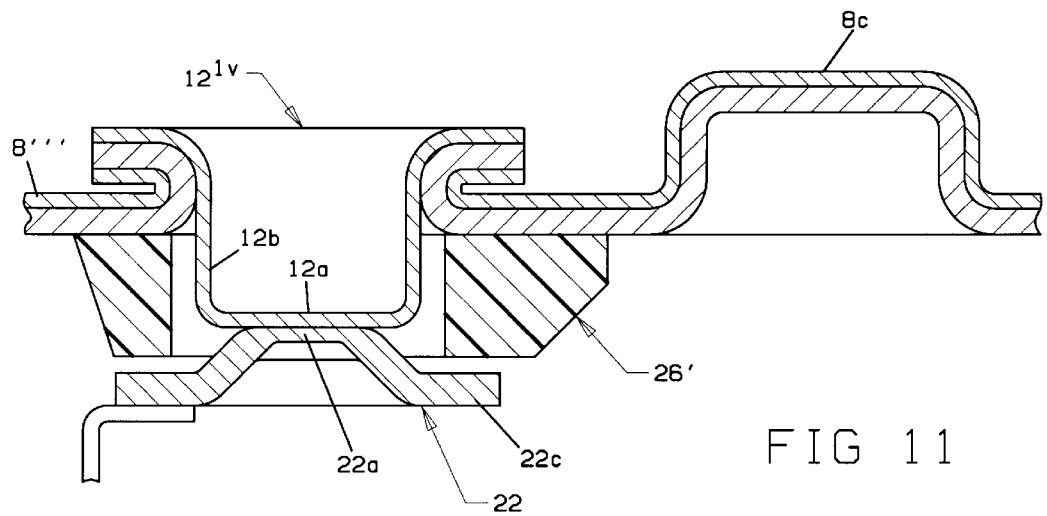

FIGS. 9–11 show modified embodiments suitable for use with a cover plate of the type which is attached to the cell housing by crimping through an insulative seal member. In such cases, cup member $12^{IV}$ can be mounted directly to the cover which serves as a support, as shown in FIGS. 9–11 by laser welding or the like to form a hermetic seal. By way of example, the cover member could be formed of clad material such as stainless steel/aluminum as shown by cover member 8' of FIG. 9 and 8''' of FIG. 11 or it could be formed of a solid piece of suitable material such as aluminum as shown by cover 8" of FIG. 10. A vertically raised offset 8c or a piece of cold rolled steel 8c' or the like of FIG. 10 can serve as a convenient feature for making electrical connection.

Figure 12:
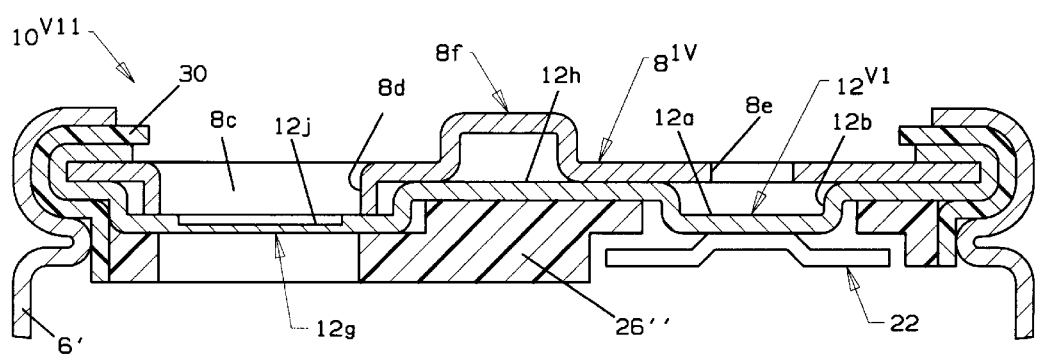
FIG. 12 is a cross sectional view of the top portion of an embodiment having a composite crimped cover.
Figure 12A:
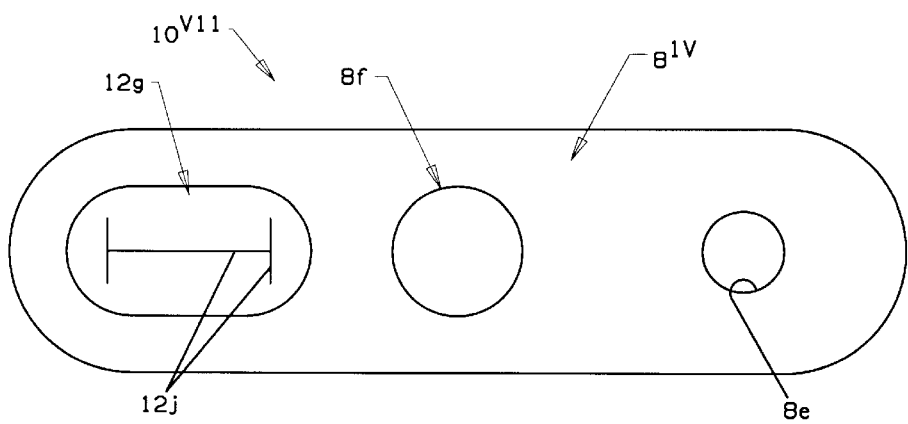
FIG. 12a is a simplified top plan view of the FIG. 12 composite cover.

FIGS. 12 and 12a show another modification of a current interrupt device adapted for use with electrochemical cells having a crimped cover. Current interrupt device $10^{VII}$ shown in FIG. 12 combines a crimp connected composite cover $8^{IV}$ comprising a support layer and underlying membrane or sheet having a current interrupt cup-shaped member $12^{VI}$ integrally formed with a pressure vent 12g in which the membrane forms part of the current path of the electrochemical cell. Cup-shaped member $12^{VI}$ and pressure vent 12g are formed from a sheet 12h of suitable material such as aluminum or copper depending upon the intended polarity of the cover as discussed above. Pressure vent 12g is preferably formed with a reduced thickness portion, such as a coined portion 12j, to facilitate rupture when subjected to a predetermined pressure. FIG. 12a shows coined portion 12j in the general form of an I beam. Another optimized configuration (not shown) for coined portion 12j follows the perimeter of aperture 8c, slightly inboard thereof, aperture 8c formed in a support layer of cover $8^{IV}$ to be discussed. The support layer of cover $8^{IV}$, formed of suitable material such as nickel plated cold rolled steel, has an aperture 8c aligned with pressure vent 12g and a downwardly extending wall portion 8d to prevent upward movement of sheet 12h beyond the perimeter of the pressure vent area. The support layer of cover $8^{IV}$ has an aperture 8e in communication with cup-shaped member $12^{VI}$ to allow air displacement in the event of actuation of cup-shaped member $12^{VI}$, i.e., collapse of side wall 12b and which can also be used to place other current interrupt mechanisms as discussed above. Cover $8^{IV}$ is also advantageously formed with an upwardly extending offset portion 8f to facilitate electrical connection to the cover and serves as one of the terminals of the electrochemical cell. The support layer of cover $8^{IV}$ and membrane 12h are crimped to side wall 6' through an electrically insulative gasket 30 which also serves as an electrolyte seal. Although a separate electrical insulator 26" is shown, it can be combined into a single component with gasket 30, if desired.

FIGS. 13, 13a, 13b, 14 and 14a show other embodiments in which a composite cover having a support layer and a generally co-extensive membrane layer are used which include both a pressure vent and a current interrupt member in which one of the terminals of the electrochemical cell is mounted in an aperture formed in the support and membrane layers and is electrically isolated therefrom.

Figure 13:
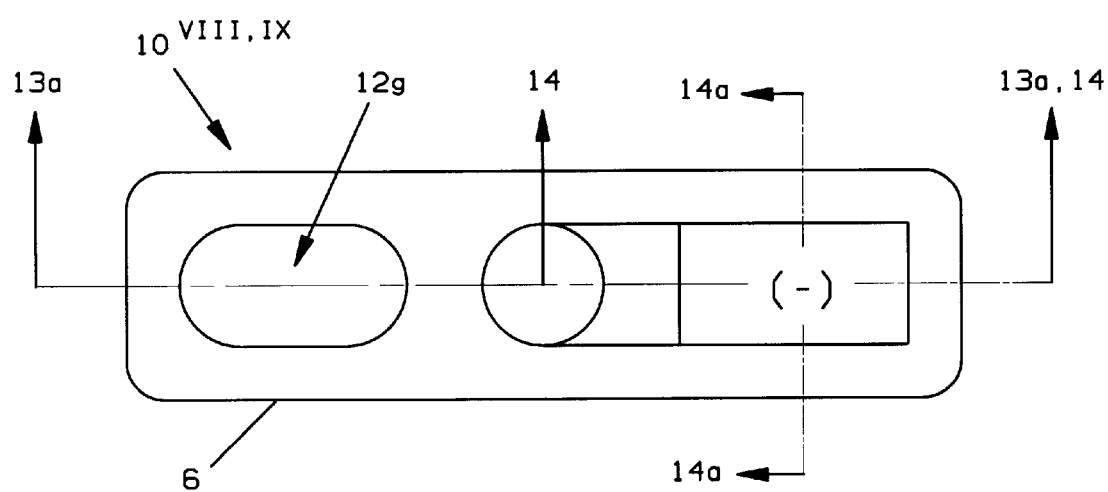

With reference to FIGS. 13, 13a and 13b a current interrupt device $10^{VIII}$ is shown having a composite cover 8v comprising support layer 8g formed, for example, of aluminum, and having an upwardly extending wall portion 8d. A thin membrane layer 12k of aluminum or the like is disposed on the lower side of the support layer and has an upwardly extending wall portion 12 to form the composite cover which is sealingly attached to side wall 6 by laser welding or the like. Support layer 8d is preferably formed with three apertures. The first aperture in the support layer is aligned with a corresponding aperture in membrane layer 12k with an electrically conductive rivet member 42 received though respective neck portions 8h, 12m and 44a of an electrically insulative gasket 44, to maintain electrical isolation of the rivet member relative to the support layer and membrane layer. Electrode tab 24 from the core of the cell is electrically attached to the rivet member. It will be noted that the rivet member 42 also serves as a convenient way to handle the composite cover during assembly.

A pressure vent 12g is optionally provided by forming a second aperture 8c with membrane layer 12k extending across aperture 8c and with a weakened portion (not shown) to facilitate rupture when subjected to a predetermined pressure as in the embodiment of FIG. 12. The membrane layer is supported by the support layer around the perimeter of the aperture by downwardly extending wall portion or flange 8d, shown in the drawings; however, it will be realized that appropriate support could be provided without the flange.

A third aperture 8e is formed in support layer 8g in alignment with cup-shaped member 12$^{VI}$ of membrane layer 12k. A switch base 46 formed of electrically insulative material such as a glass filled Nylon is received on support layer 8g and with an opening aligned with each aperture in the support layer and has a movable actuator 40e disposed at the distal free end of a cantilever beam 46a extending into an opening formed in switch base 46 in alignment with aperture 8e. Actuator 40e extends into the cup-shaped member 12$^{VI}$ and is spaced slightly above bottom wall 12a. A frame 48 of suitable material such as nickel plated steel is insert molded in switch base 46 and later severed into frame ends 48a, 48b, strap 48c and terminal 48d. Terminal 48d has a lower portion 48e disposed on platform 46b to which one end of an electrically conductive movable contact arm 50 is fixed, as by welding. The opposite end of arm 50 is biased into electrical engagement with an offset portion 48f of strap 48c.

Composite cover 8$^V$ is assembled by taking support layer 8g, gasket 44 and membrane layer 12k and attaching them to one another by rivet member 42. The switch base 46 is then placed on support layer 12k and attached thereto by welding the lower portion of frame ends 48a, 48b to the support layer and strap 48c is ultrasonically welded to the upper portion of rivet member 42 and movable member 50 is welded to portion 48e. Composite cover 8v is assembled to the cell by welding strap 24 to the lower side of the rivet member and then inserting the cover into the casing. Wall portions 6, 12 and 8d are then welded together around the periphery of the housing to form an effective seal. Sandwiching membrane 12k between support layer 8g and side wall 6 obviates the prior art difficulties of welding the frangible discrete pressure vent diaphragms to the pressure vent apertures formed in covers thereby resulting in an improved reliable, easy to effect seal.

As described, the housing of the electrochemical cell is formed of suitable material, such as aluminum which is connected to the cell's core (not shown) to provide a positive polarity. The support and membrane layers are preferably formed of the same material and are electrically connected together in the same polarity. Rivet member 42 of suitable material, such as nickel plated steel, is connected to the cell's core to provide negative polarity which extends through strap 48c, movable contact arm 50 to terminal 48d, the negative terminal. Upon collapse of the side wall of cup-shaped member 12$^{VI}$ due to a selected increase in internal cell pressure, as discussed supra, bottom wall 12a will translate upwardly, as shown in FIG. 13b, causing actuator 40e to move upwardly which in turn forces movable arm 50 out of electrical engagement with offset strap portion 48f to permanently break the current path. In this connection it should be noted that contact arm 50 can be formed of suitable spring material, or if desired, of bimetallic material or Nitinol to provide current interruption due to a selected increase in temperature.

Figure 14:
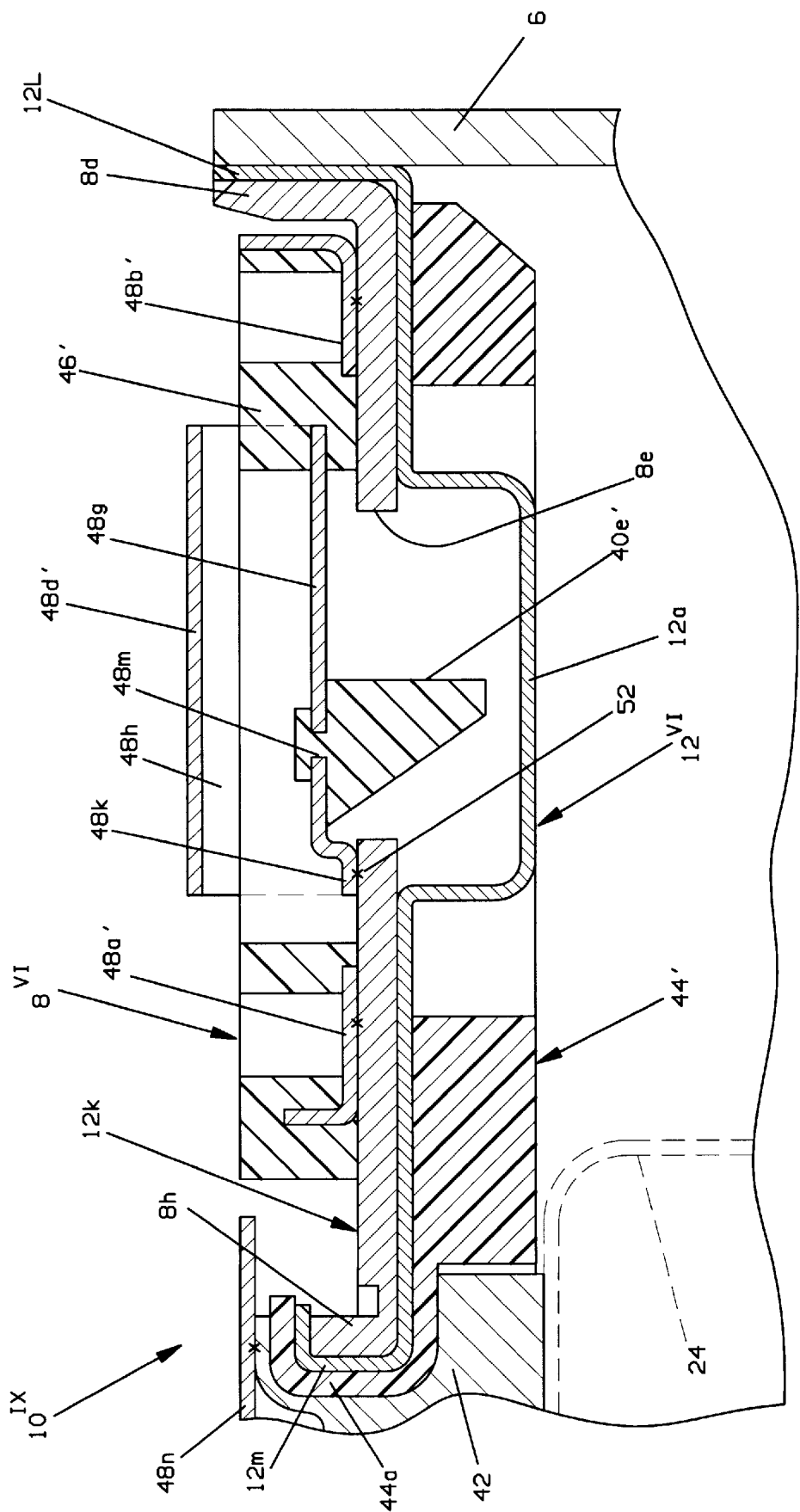
FIG. 14 is a cross sectional view taken on line 14—14 of FIG. 13.
Figure 14A:
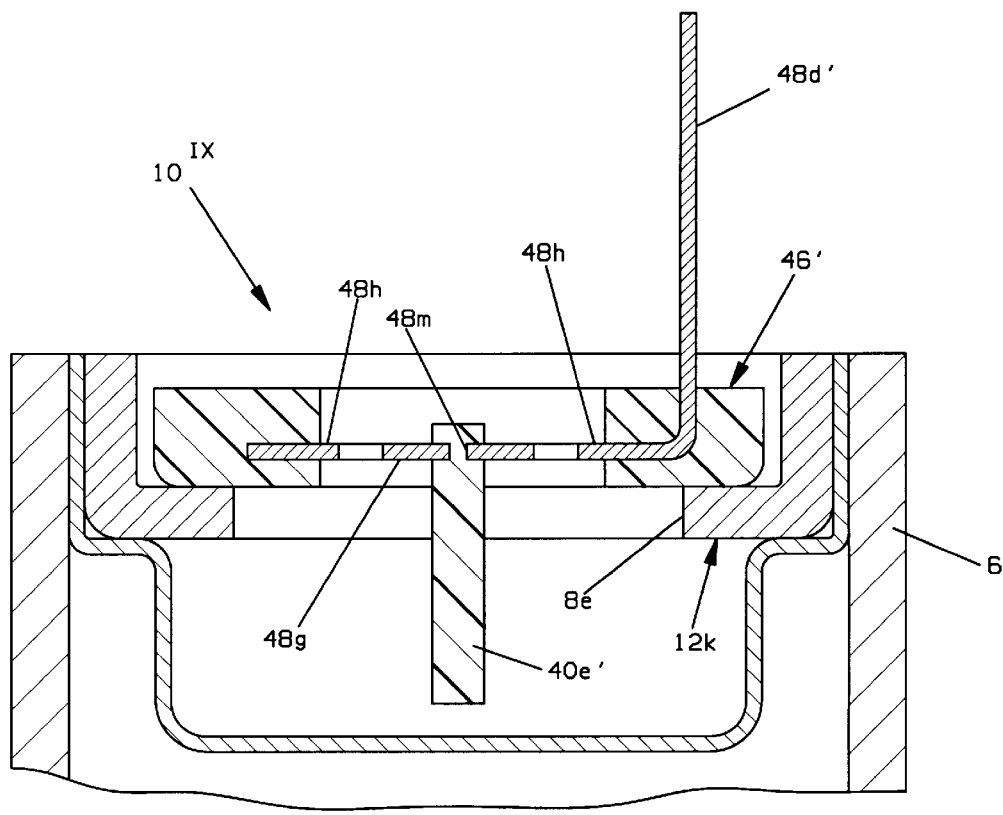
FIG. 14a is a cross sectional view taken on line 14a—14a of FIG. 13.

With reference to FIGS. 14, 14a, a modified embodiment 10$^{IX}$ is shown in which the current interrupt device is in the form of a switch in series with the positive polarity of the cell. Switch base 46' is shown to extend primarily over cup-shaped member 12$^{VI}$; however, if desired, the base can be configured to extend essentially over the entire cover 8$^{VI}$ as in the FIGS. 13a, 13b embodiment. As shown in FIG. 14, the switch base 46' is attached to cover 8$^{VI}$ by means of frame end portions 48a', 48b' which are welded to support layer 12k. Movable contact arm 48g and terminal 48d' are formed from the same strip 48h and are maintained integrally connected with one another. Terminal 48d is shown in FIG. 14a prior to its being folded over to its fixed configuration shown in FIG. 14. Movable contact arm 48g has its distal free end 48k attached directly to support layer 12k by a selected weak, frangible weld 52. Actuator member 40e' is a separately formed member of electrically insulative material which is attached to movable arm 48g as by molding the member through an aperture 48m formed in arm 48g. The FIGS. 14, 14a embodiment provides an electrochemical cell made in accordance with the invention in which terminal 48d' is the same polarity as the cell's housing, i.e., wall 6, while the opposite polarity terminal 48n is connected, as by welding, to rivet member 42 with both terminals provided on cover 8$^{VI}$. Terminal 48n can also be advantageously insert molded in switch 46' as part of frame 48 and severed therefrom in the same manner as end portions 48a', 48b'.

Upon a sufficient increase in internal cell pressure causing the side wall of cup-shaped member 12$^{VI}$ to collapse, wall 12a will move upwardly in the same manner as depicted in FIG. 13b, causing actuator 40e' to apply an upward force on contact arm 48g to fracture weld 52 and move the formerly welded end away from support layer 12k and interrupt the circuit path.

FIGS. 13a and 13b show gasket 44 extending the full width, i.e., extending essentially entirely across the cell as shown in FIGS. 13a, 13b in order to protect the pressure actuator (the cup-shaped member) and the pressure vent from physical damage during handling, assembly and shipping, however, it will be realized that this is optional as long as rivet member 42 and strap 24 are maintained electrically isolated from components of the opposite polarity.

Although the invention has been described with regards to specific preferred embodiments thereof, variations and modifications will become apparent to those skilled in the art. For example, it is within the purview of the invention to add an element having a positive temperature coefficient of resistivity in the current path to provide over current protection, if desired. Such an element may be in the form of an annular washer of conductive polymer in each cell, for example, or it may be a separate element serially connected to a plurality of cells, if desired.

Side wall 12b can also be caused to catastrophically collapse by forming the cup-shaped member from material having a modulus of elasticity, side wall thickness and side wall length such that when the internal pressure reaches a predetermined level, without exceeding the ultimate strength of the side wall material, the side walls buckle into a permanently deformed, configuration. Whether the side wall collapsing mechanism is based on exceeding the material's ultimate strength or on the buckling phenomena, end wall 12a is formed so that is remains relatively flat within the diameter formed by circular groove 12e. A rib offset portion discussed above or other strengthening feature may be formed in end wall 12a, if desired, to aid in maintaining the wall in an otherwise flat condition.

The invention provides a pressure sensor and actuator, i.e., the cup-shaped member, having the same electrical polarity as the cell casing thereby enabling the cup diameter to be maximized for a given cell thickness. This provides catastrophic collapse and desired translation with maximum diaphragm (membrane) material thickness and/or minimum actuation pressure levels without potential problems relating to short circuiting between the cup-shaped member and the cell casing.

It is the intention that the appended claims be interpreted as broadly as possible in view of the prior art to include all such variations and modifications.

What is claimed:

1. Current interrupt apparatus for use with an electrochemical cell having a housing with an open end and comprising a cover having a support layer receivable in the open end co-extensive therewith to close the open end of the electrochemical cell, the electrochemical cell having a positive and a negative terminal, an aperture formed in the support layer, a membrane having at least a portion formed into a cup-shaped member having a generally flat end wall, the cup-shaped member having a side wall depending from the flat end wall extending along a length to a support portion, the support portion being attachable to the support layer with the cup-shaped member being in alignment with the aperture and with the side wall extending in a direction toward the interior of the housing and with the flat end wall generally lying in a plane parallel to a plane in which the cover lies, said membrane and the support layer forming a composite in which they are co-extensive with one another and with the open end of the electrochemical cell, an electrical current path formed between an electrode within the housing and one of the positive and negative terminals, the material of the membrane being chosen to have a selected material properties so that upon being subjected to a pressure level from within the housing above a predetermined level, the side wall will catastrophically collapse with the configuration of the cup-shaped member changing to an opposite, inverted configuration with the side wall extending in a direction away from the interior of the housing and with the flat end wall continuing to lie generally in a plane generally parallel to the plane in which the cover lies, the catastrophical collapse of the side wall interrupting the current path.

2. Current interrupt apparatus for use with an electrochemical cell according to claim 1 in which the electromechanical cell is prismatic in configuration.

3. Current interrupt apparatus for use with an electrochemical cell according to claim 1 in which the plane in which the flat end wall lies forms an angle greater than 90° with the side wall of the cup-shaped member.

4. Current interrupt apparatus for use with an electrochemical cell having a housing formed with an open end and comprising a cover having a support layer receivable in the open end co-extensive therewith to close the open end of the electrochemical cell, the electrochemical cell having a positive and a negative terminal, an aperture formed in the support layer, a membrane having at least a portion formed into a cup-shaped member having a generally flat end wall, the cup-shaped shaped member having a side wall depending from the flat end wall extending along a length to a support portion, the support portion being attachable to the support layer with the cup-shaped member being in alignment with the aperture and with the side wall extending in a direction toward the interior of the housing and with the flat end wall generally lying in a plane parallel to a plane in which the cover lies, an electrical current path formed between an electrode! within the housing and one of the positive and negative terminals, one of the positive and negative terminals comprising an electrically conductive member having an outer, annular flange portion with an outer periphery and upper and lower opposed face surfaces, the apparatus further comprising an electrically conductive crimp ring and an electrically insulative sleeve, the support potion of the cup-shaped member being disposed about the outer periphery of the annular flange portion and being in contact with both the upper and lower opposed surfaces, the annular flange portion and support portion received in the electrically insulative sleeve and crimped to the crimp ring with the electrically insulative sleeve electrically separating the cup-shaped member and support member from the crimp ring and providing an elongated tortuous fluid seal path therebetween and the crimp ring being fixedly mounted to the cover in fluid sealed relation, the material of the membrane being chosen to have a selected material properties so that upon being subjected to a pressure level from within the housing above a predetermined level, the side wall will catastrophically collapse with the configuration of the cup-shaped member changing to an opposite, inverted configuration with the side wall extending in a direction away from the interior of the housing and with the flat end wall continuing to lie generally in a plane generally parallel to the plane in which the cover lies, the catastrophical collapse of the side wall interrupting the current path.

5. Current interrupt apparatus for use with an electrochemical cell having a housing formed with an open end and comprising a cover having a support layer receivable in the open end co-extensive therewith to close the open end of the electrochemical cell, the electrochemical cell having a positive and a negative terminal, an aperture formed in the support layer, a membrane having a least a portion formed into a cup-shaped member having a generally flat end wall, the cup-shaped member having a side wall depending from the flat end wall extending along a length to a support portion, the support portion being attachable to the support layer with a cup-shaped member being in alignment with the aperture and with the side wall extending in a direction toward the interior of the housing and with the flat end wall generally lying in a plane parallel to a plane in which the cover lies, an electrical current path formed between an electrode within the housing and one of the positive and negative terminals, said cup-shaped membrane being formed of electrically conductive material and being part of the current path and further comprising an electrically conductive plate welded to the flat end wall on the side thereof facing the interior of the housing, the electrode being connected to the electrically conductive plate, the material of the membrane being chosen to have a selected material properties so that upon being subjected to a pressure level from within the housing above a predetermined level, the side wall will catastrophically collapse with the configuration of the cup-shaped member changing to an opposite, inverted configuration with the side wall extending in a direction away from the interior of the housing and with the flat end wall continuing to lie generally in a plane generally parallel to the plane in which the cover lies, the catastrophical collapse of the side wall breaking the weld between the flat end wall and the electrically conductive plate to interrupt the electric current path.

6. Current interrupt apparatus for use with an electrochemical cell having a housing formed with an open end and comprising a cover having the support layer receivable in the open end co-extensive therewith to close the open end of the electrochemical cell, the electrochemical cell having a positive and a negative terminal, an aperture formed in the support layer, a membrane having at least a portion formed into a cup-shaped member having a generally flat end wall, the cup-shaped member having a side wall depending from the flat end wall extending along a length to a support portion, the support portion being attachable to the support layer with the cup-shaped member being in alignment with the aperture and with the side wall extending in a direction toward the interior of the housing and with the flat end wall generally lying in a plane parallel to a plane in which the cover lies, an electrically conductive support member having an outer periphery and an opening therethrough, the support portion of the cup-shaped member received about the outer periphery of the support member, a terminal plate and an electrically insulative annular member received on the support member, an electrically insulative, flexible sealing sleeve within which the support of the cup-shaped member, the support member, terminal plate and insulative annular member are received and a crimp ring crimping the terminal plate, insulative annular member, support portion and support member together with the terminal plate electrically isolated from the support portion and support member, the crimp ring extending through the aperture and being hermetically attached to the cover, a movable electrical contact electrically connected to the terminal plate and normally biased into electrical engagement with the support member, an electrically insulative motion transfer member having a portion disposed adjacent to the flat end wall and being received through the opening in the support member and aligned with the movable contact, the motion transfer member transferring motion from the flat end wall to the movable contact upon catastrophic collapse of the side wall to move the movable contact permanently out of engagement with the support member, an electrical current path formed between an electrode within the housing and one of the positive and negative terminals, the material of the membrane being chosen to have a selected material properties so that upon being subjected to a pressure level from within the housing above a predetermined level, the side wall will catastrophically collapse with the configuration of the cup-shaped member changing to an opposite, inverted configuration with the side wall extending in a direction away from the interior of the housing and with the flat end wall continuing to lie generally in a plane generally parallel to the plane in which the cover lies, the catastrophical collapse of the side wall interrupting the current path.

7. Current apparatus for use with an electrochemical cell according to claim 6 in which the motion transfer member is integrally formed with the insulative annular member, the insulative annular member comprising an annular portion with an arm extending radially inwardly from the annular portion to a central portion, the motion transfer member being formed by a leg depending from a free end portion of the arm, and a reduced thickness hinge formed in the arm.

8. Current interrupt apparatus for use with an electrochemical cell according to claim 6 in which the motion transfer member is integrally formed with the insulative annular member, the insulative annular member comprising an annular portion defining a central portion with at least two arms extending inwardly in a spiral to a central portion having a contact receiving opening to provide the capability of vertical motion of the central portion, a stationary contact portion of the support member normally extending through the contact receiving opening and the motion transfer member being formed by at least one leg depending from the central portion.

9. Current interrupt apparatus for use with an electrochemical cell having a housing formed with an open end and comprising a cover having a support layer receivable in the open end co-extensive therewith to close the open end of the electrochemical cell the electrochemical cell having a positive and a negative terminal, an aperture formed in the support layer, a membrane having at least a portion formed into a cup-shaped member having a generally flat end wall, the cup-shaped member having a side wall depending from the flat end wall extending along a length to a support portion, the support portion being attachable to the support layer with the cup-shaped member being in alignment with the aperture and with the side wall extending in a direction toward the interior of the housing and with the flat end wall generally lying in a plane parallel to a plane in which the cover lies said support portion of the cup-shaped member being hermetically attached directly to the cover and the cover being crimped to and electrically isolated from the housing, an electrical current path formed between an electrode within the housing and one of the positive and negative terminals, the material of the membrane being chosen to have a selected material properties so that upon being subjected to a pressure level from within the housing above a predetermined level, the side wall will catastrophically collapse with the configuration of the cup-shaped member changing to an opposite, inverted configuration with the side wall extending in a direction away from the interior of the housing and with the flat end wall continuing to lie generally in a plane generally parallel to the plane in which the cover lies, the catastrophical collapse of the side wall interrupting the current path.

10. Current interrupt apparatus for use with an electrochemical cell according to claim 9 in which the cover has an inside surface facing the interior of the housing and the support portion is welded to the inside surface.

11. Current interrupt apparatus for use with an electrochemical cell according to claim 9 in which the cover is formed of clad material having first and second layers and the material is rolled over around the aperture so that the layer of the cover facing the interior of the housing is rolled over to face away from the interior and the support portion is welded to the rolled over portion of the layer facing away from the interior of the housing.

12. Current interrupt apparatus for use with an electrochemical cell having a housing formed with an open end and comprising a cover having a support layer receivable in the open end co-extensive therewith to close the open end of the electrochemical cell, the electrochemical cell having a positive and a negative terminal, an aperture formed in the support layer, a membrane having at least a portion formed into a cup-shaped member having a generally flat end wall, the cup-shaped member having a side wall depending from the flat end wall extending along a length to a support portion, the support portion being attachable to the support layer with the cup-shaped member being in alignment with the aperture and with the side wall extending in a direction toward the interior of the housing and with the flat end wall generally lying in a plane parallel to a plane in which the cover lies an electrical current path formed between an electrode within the housing and one of the positive and negative terminals, the material of the membrane being chosen to have a selected material properties and a generally circular groove of reduced thickness formed in the flat end wall of the cup-shaped member at a distance from the side wall to compensate for variations in the geometry and material properties of the cup-shaped member, so that upon being subjected to a pressure level from within the housing above a predetermined level, the side wall will catastrophically collapse with the configuration of the cup-shaped member changing to an opposite, inverted configuration with the side wall extending in a direction away from the interior of the housing and with the flat end wall continuing to lie generally in a plane generally parallel to the plane in which the cover lies due to such pressure level acting on the flat end wall creating stress in the side wall effectively through a moment arm, the catastrophical collapse of the side wall interrupting the current path.

13. Current interrupt apparatus for use with an electrochemical cell having a housing with a cover and having a cup-shaped member with a generally flat end wall and a side wall depending therefrom to support portion in which the cup-shaped member is mounted in an aperture formed in the cover and the side wall protrudes from the support portion into the interior of the housing to be exposed to fluid pressure generated in the housing which creates stress in the side wall effectively acting through a moment arm comprising the method steps of adjusting the effective length of the moment arm by choosing a radius between the flat end wall and the side wall to compensate for variations in geometry and material properties of the cup-shaped member.

14. In an electrochemical cell having a housing with a cover and having a cup-shaped member with a generally flat end wall and a side wall depending therefrom to a support portion in which the cup-shaped member is mounted in an aperture formed in the cover and the side wall protrudes from the support portion into the interior of the housing to be exposed to fluid pressure generated in the housing which creates stress in the side wall effectively acting through a moment arm comprising the method steps of adjusting the effective length of the moment arm by forming a generally circular groove of reduced thickness in the end wall adjacent to the side wall at a distance from the side wall selected to compensate for variations in geometry and material properties of the cup-shaped member.

15. Current interrupt apparatus for use with an electrochemical cell having a housing with a cover and having a positive and a negative terminal, the cover having an outer periphery and being a composite comprising a first support layer and a second membrane layer lying generally in a first plane and with each layer formed with an upstanding flange extending around the outer periphery for welding attachment with the housing with the membrane layer disposed between the support layer and the housing, the support having at least three apertures, the second membrane layer having an aperture aligned with the first aperture in the support layer, an electrically conductive rivet received through the first aperture in the support layer and the aperture in the membrane layer aligned with an electrically insulative sleeve between the rivet and the layers, the rivet having an externally exposed, relative to the housing, top portion and an internally exposed, relative to the housing, lower portion for connection to an electrical strap, the support layer having a second aperture in the support layer with the membrane layer extending across the second aperture, the membrane layer being formed with a coined portion aligned with the second aperture to serve as a pressure vent, a third aperture in the support layer, the membrane layer formed with a cup-shaped portion having a side wall extending downwardly from the plane to a generally flat end wall and aligned with the third aperture, the flat end wall lying in a plane parallel to the first plane, the material of the membrane being chosen to have selected material properties being chosen so that upon being subjected to a pressure level from within the housing above a predetermined level, the pressure will exceed the ultimate strength of the side wall material causing the side wall to catastrophically collapse with the configuration of the cup-shaped portion changing to an opposite, inverted configuration with at least a portion of the side wall extending in a direction away from the interior of the housing and with the flat end wall continuing to lie generally in a plane generally parallel to the first plane.

16. Current interrupt apparatus according to claim 15 in which the second aperture of the support layer is defined by a downwardly extending flange.

17. Current interrupt apparatus according to claim 15 further comprising a electrically insulative motion transfer member supported on the support layer and having a portion extending into the cup-shaped portion and an electrically conductive member cantilever mounted on a terminal member above the motion transfer member, the cantilever mounted member having a free distal end having a contact portion, an electrically conductive strap attached to the top portion of the rivet and having an end portion disposed beneath the contact portion whereby collapse of the side wall of the cup-shaped member will move the motion transfer member and, in turn, the cantilever mounted member out of electrical engagement with the electrically conductive strap.

18. Current interrupt apparatus according to claim 15 further comprising an electrically conductive terminal having an upper terminal portion and a lower portion having opposite ends, one opposite end mounted on the support layer electrically insulated therefrom on one side of the cup-shaped portion and the opposite end electrically connected to but movable from the support layer on another side of the cup-shaped portion and an electrically insulative motion transfer motion transfer member extending from the lower portion of the terminal into the cup-shaped portion whereby collapse of the side wall of the cup-shaped portion will move the motion transfer member and, in turn, the lower portion of the terminal out of engagement with the support layer.

19. Current interrupt apparatus according to claim 17 in which the opposite end of the lower portion of the terminal is attached to the support layer with a weak, frangible weld.

20. Apparatus for use with an electrochemical cell having a housing with a cover and having a positive and a negative terminal, the cover having an outer periphery and being a composite comprising a first support layer and a second membrane layer lying generally in a first plane and with each layer formed with an upstanding flange extending around the outer periphery for welding attachment with the housing with the membrane layer disposed between the support layer and the housing, the support having at least two apertures, the second membrane layer having an aperture aligned with the first aperture in the support layer, an electrically conductive rivet received through the first aperture in the support layer and the aperture in the membrane layer aligned with an electrically insulative sleeve between the rivet and the layers, the rivet having an externally exposed, relative to the housing, top portion and an internally exposed, relative to the housing, lower portion for connection to an electrical strap, the support layer having a second aperture in the support layer with the membrane layer extending across the second aperture, the membrane layer being formed with a coined portion aligned with the second aperture to serve as a pressure vent.

* * * * *